(12) United States Patent
Karapetyan

(10) Patent No.: US 7,051,445 B1
(45) Date of Patent: May 30, 2006

(54) APPARATUS GENERATING A LIGHT ILLUMINATED LINE

(76) Inventor: Armen Karapetyan, 1935 N. Van Ness Ave., Los Angeles, CA (US) 90068

( * ) Notice: Subject to any disclaimer, the term of this patent is extended or adjusted under 35 U.S.C. 154(b) by 0 days.

(21) Appl. No.: 11/043,843

(22) Filed: Jan. 26, 2005

(51) Int. Cl.
*G01C 1/00* (2006.01)

(52) U.S. Cl. .............. 33/285; 33/278; 33/415; 33/471; 33/DIG. 21

(58) Field of Classification Search .......... 33/285–286, 33/DIG. 21
See application file for complete search history.

(56) References Cited

U.S. PATENT DOCUMENTS

| | | | | |
|---|---|---|---|---|
| 3,783,524 A | * | 1/1974 | Ciani et al. | 33/285 |
| 5,063,679 A | * | 11/1991 | Schwandt | 33/347 |
| 5,488,777 A | * | 2/1996 | Erdesky | 33/280 |
| 5,836,081 A | * | 11/1998 | Orosz, Jr. | 33/290 |
| 6,423,076 B1 | * | 7/2002 | Cardwell et al. | 606/130 |
| 6,453,568 B1 | * | 9/2002 | Hymer | 33/276 |
| 6,478,452 B1 | | 11/2002 | Richardson et al. | |
| 6,493,955 B1 | | 12/2002 | Moretti | |
| 6,494,371 B1 | | 12/2002 | Rekow et al. | |
| D470,423 S | | 2/2003 | Loudenslager et al. | |
| 6,735,879 B1 | | 5/2004 | Malard et al. | |

\* cited by examiner

*Primary Examiner*—Yaritza Guadalupe

(57) ABSTRACT

An improved apparatus generating light illuminated line provides a possibility to produce and propagate the light line along the reference surface under any desirable angle. The improved apparatus generating light illuminated line includes a circular scale means comprising a degree scale and two projections, each of which includes an aperture intended for an appropriate fixing means. Each fixing means comprises a handle rigidly connected to a pin and a back-moving spiral spring located in a spring opening of the appropriate projection. Also, the improved apparatus generating light illuminated line includes a pivotable light line generating portion hingedly coupled with the circular scale means.

3 Claims, 3 Drawing Sheets

35-35

APPARATUS GENERATING A LIGHT ILLUMINATED LINE

FIELD OF THE INVENTION

This invention relates to instruments, apparatus, systems and devices illuminating a light lines and, more particularly, to the instruments producing a narrow elongated line of light on a surface.

BACKGROUND OF THE INVENTION

Presently, different instruments exist which use a light (laser) ray to project on a surface. The power light source or laser can be generally used in order to produce the light line. It is known, that the diode-lasers are mostly used as sources of illumination in various graphics applications. For such applications some optical instruments have been devised to optically shape the characteristic astigmatic light output of a diode-laser into a symmetrical anastigmatic form that can be focussed into an biaxially symmetrical spot or illuminating area. For instance, a very small, uniform spot of light projected from a diode-laser can be used to record correspondingly small spots on a light sensitive medium. A plurality of small spots recorded over an area can be used to record a graphic image or pattern. A line of small light dots can form a light line also, but more efficient use of the laser diode (a.k.a. the diode-laser), when the laser diode light could be projected into the form of a fine narrow line.

For example, the U.S. Pat. No. 6,478,452 describes the illumination apparatus for projecting the light-output of a semiconductor-laser into a fine line. The light-output propagates in a direction mutually perpendicular to the first and second axes. The optical system is arranged cooperative with the semiconductor-laser to focus the light-output in the first and second axes at respectively first and second focal points spaced apart in the propagation direction. At a plane intersecting the first focal point perpendicular to the direction of propagation, the focused semiconductor-laser light-output is formed into a line of light having a width in the first axis and a length in the second axis. The first focal point is closer to the optical system than the second focal point. The semiconductor laser emitting light-output has a different divergence in characteristic fast and slow axes. The fast and slow axes correspond to above discussed first and second axes respectively. The system uses the manufactured laser diode (e.g. such as the laser diode by "Hitachi Co.", "Sony", etc.). The system includes first, second and third lenses spaced apart in consecutive numerical order in the direction of propagation. The first and third lenses each has a positive dioptric power in both the first and second axes. The second lens has zero dioptric power in the first axis and positive dioptric power in the second axis. The first lens is spaced apart from the semiconductor laser by a distance equal to about its focal length. The second lens is spaced apart from the third lens by a distance greater than the second-axis focal length. The third lens has a focal length greater than the focal length of the first lens, and the second lens has a second-axis focal length greater than the focal length of the third lens. The first focal point is closer to the optical system than the second focal point.

The first convex—convex lens is located at a distance about equal to its effective focal length from diode-laser and collimates beam in both the fast and slow axes considering that the astigmatism of beam is not corrected by the first lens. The second plano-convex cylindrical lens, in the slow axis brings the collimated beam to an intermediate focus between itself and third lens, while in the fast axis the beam remains collimated. The third convex—convex lens receives a diverging beam in the slow axis and a collimated beam in the fast axis. Accordingly, light in the fast axis is brought to a sharp focus and light in the slow axis is brought to another focus further removed from exit face of the third lens. A result of this is that in an X-Y plane at one of the focuses there is a line of light having a width in the fast axis defined by the fast axis focal-spot size and a length in the slow axis defined by the beam width in the slow axis at the defined distance from exit-face of the third lens. The ratio between the beam width in the slow axis and the focal-spot size in the fast axis can be at rank from 20:1 to 50:1.

While this known system produces the light line, it is complex, comprises at least three lenses requiring precise focusing.

Another U.S. Pat. No. 6,494,371 presents the diode-laser light projector also producing a liner array. The optical system in this invention is arranged to focus the fast-axis diverging rays in a focal plane perpendicular to the longitudinal optical axis, and arranged to form the slow-axis diverging rays into a plurality of bundles of parallel rays, one thereof for each diode-laser. The bundles of parallel rays intersect in the focal plane. The optical system causes light from the diode-lasers to be formed into a line of light in the focal plane. The line of light has a width in the fast axis and a length in the slow axis. the emitting apertures of the diode-laser bars are located in a slow-axis object plane of the optical system and the bundles of parallel rays intersect in a slow-axis exit-pupil of the optical system. Fast axis rays are focussed in the slow-axis exit-pupil thereby providing the line of light. The line of light has a width equal to about the fast-axis focal spot-size and a length about equal to the width of the slow-axis exit-pupil. Considering the first variant of invention, the optical system does not include any microlens arrays wherein individual optical elements operate on rays from corresponding individual diode-lasers. In the inventive optical system, rays from all diode-lasers traverse all optical elements of the optical system. In another aspect of the mentioned prior art, the optical system may include one or more physical stops arranged to prevent selected portions the fast and slow-axis diverging rays from the diode-laser array from reaching the fast-axis focal plane. The selected portions are chosen to optimize the intensity of light distribution along the length of the line of light, and each of the physical stops is an elongated stop formed from a length of optical fiber having a length extending completely through the fast-axis rays from the diode-laser array. The projector includes the line projector comprising a light-source a diode-laser bar. Diode laser bar is in thermal contact with a heat-sink. Diode-laser bar also includes a plurality of diode-lasers, each thereof having an emitting aperture. The diode laser bar can be defined as having a fill-factor which is the percentage of the total length of the bar occupied by diode-lasers and is dependent on the width of the diode-lasers and spacing between diode lasers. The diode-laser bar (and diode-lasers therein) is also characterized by a slow axis X parallel to the width direction of emitting apertures, and a fast axis Y perpendicular to slow axis X. Light is emitted from an emitting aperture in a general direction (axis) of propagation Z mutually perpendicular to the fast and slow axes. The light is emitted in the form of a diverging beam. Rays of beam in fast axis Y diverge at an included angle of about 32°. Rays of beam in the slow axis X diverge at an included angle of about 7.5°. Additionally the line-projector includes an (anamorphic) optical system which has a different optical prescription in the fast axis Y and slow axis X.

Optical system can be defined as having a longitudinal axis aligned parallel to the general direction of propagation (Z axis) of light from beams. Optical system includes two lenses. The first lens has positive optical (dioptric) power in fast axis Y but has zero optical power in slow axis X, and the second lens has positive optical power in both the fast and slow axes.

Also, the optical system comprises an object plane located at a first distance from the first lens equal to about the effective focal length, and at a second distance from the second lens about equal to an effective focal length. Both distances are specified in each case from a principal plane of the lens. Emitting apertures of diode-laser bar are aligned about in object plane of optical system. The relative placement of the first lens and emitting apertures causes rays leaving the emitting apertures in the fast axis to be collimated. The collimated fast axis rays are thus incident on the second lens, which focuses the fast-axis collimated rays into a focal plane about one effective focal length of the this second lens. Considering, that the first lens has zero optical power in the slow axis, rays leaving emitting-apertures continue through the first lens maintaining their original divergence as they are incident on second lens. Diverging sets or bundles (three) of slow-axis rays are formed by second lens into corresponding parallel sets of slow-axis rays, which from the central emitting-aperture are parallel to axis of optical system. The sets of these rays intersect in fast axis focal-plane. The intersection of rays is defined as occurring at a slow-axis pupil of optical system. The result of this is that a line of light is formed about in fast-axis focal plane. The described optical system includes a plurality of diode-lasers forming a diode-laser bar, and contributing about equally to form light line.

This projector is a complex, comprises at least two lenses (or combination of the single lenses) requiring precise focusing. Additionally, the failure of some diode-lasers significantly reduce intensity with a significant change in light distribution along the line, thereby forming some kind of dash-line instead of the uninterrupted line.

Slightly more efficient and less complex laser line creating device is described in the U.S. Pat. No. 6,735,879. This device is more directly intended for alignment of surfaces. As known, he alignment of the surface is a perennial problem in a variety of fields, ranging from construction to interior decorating. Alignment is necessary for walls that should be perpendicular to a floor. Masonry and brick-laying practitioners are well aware of the importance of plumbed and aligned surfaces and chalk lines. A home interior decorated with pictures and other wall ornamentation makes a much better appearance when the ornamentation is precisely aligned, especially with respect to vertical or horizontal axes. The conventional laser is not well-equipped for projecting a flat or planar beam of light. The essence of laser light is that it is coherent or substantially monochromatic, that is, of a single wavelength or a narrow wavelength band. It is known, that when a beam of laser light is refracted through a prism, the prism output is not a spreading of the beam as with ordinary "white" light, but rather a coherent, focused beam, very similar. The laser beam is thin and is usefully only visible when projected onto a surface. The device includes a generator and a housing having a handgrip means for handling. The generator has a first leveling device, a spirit level or "bubble" for orientation or leveling in one plane, such as horizontal or vertical. It also has a second leveling device, for orientation or leveling in a second plane perpendicular to the first plane. The housing contains a protective door with a linked switch for turning on the laser light source when opening the door for access to the laser beam. The generator also comprises the retractable pins permanently installed in the housing and raised so that the pin remains inside the housing (inside the device), collimation optics including at least one collimating lens, a projection lens, the door (aperture) providing a passage for the generated light. The housing includes the holes providing passage of the retractable pins. The light is collimated into an ovate shape by collimation optics, comprising the collimating lens(es), by techniques well known to those skilled in optic arts. The ovate beam then enters a projection lens.

This device does not provide the surface lining under different angles to the longitudinal and lateral axes (for example, under 34°).

Other known devices, such as manual leveling rotating laser with swivel head by U.S. Design Pat. No. D470,423 and instrument for obtaining a reference line by U.S. Pat. No. 6,493,955 provide some possibility to changeability of the illuminated line angle.

But, for instance, the manual leveling rotating laser with swivel head (U.S. D470,423) does not provide precise evaluation of the angle (the position of the device head is not accurate determined, e.g. it is not exactly known is the head rotated to 35° or 38° angle, etc.).

The mentioned above instrument for obtaining a reference line by (U.S. Pat. No. 6,493,955) includes the aluminum bar, which is the supporting body of the laser emitting device, two water levels mounted on the supporting body. The water levels provide the perpendicularity or parallelism with respect to the ground of the ray of light emitted from the laser diode. Also, the instrument comprises the hinge ball. The laser device is mounted on the supporting body (by a two-component resin). The device comprises also a lens, which focuses the laser ray emitted by the laser diode.

The instrument also has a cavity located in the center of the body. This cavity is intended for the ball enables the connecting of the supporting body of the device emitting the ray of light to a wall. The hingedly connecting ball is inserted in the cavity of the supporting body in respect of which it is mobile with friction, due to the fact that it is held in a cavity of the supporting body by two bushes or washers in nylon opposite each other. The bushes or washers are fixed to the supporting body of the instrument by the connecting screws.

This rotating laser has limited utility considering the same deficiency mentioned above, i.e. it does not provide precise evaluation of the angle (the position of the device head is not accurate determined, e.g. it is not exactly known is the head rotated to 35° or 38° angle, etc.).

Most known construction, mechanical and/or electrical alignment devices are cumbersome, some of them are not as useful as they could be, for instance, the use of the chalk lining devices is sometimes undesirable and/or inapplicable for the finished, interior areas.

Thus, there is a great need in the art for the improved not complex and not expensive apparatus generating light illuminated line, providing a precise angles of the light line relatively to the horizontal and/or vertical axes on the reference surface (e.g. construction wall, etc.).

OBJECT AND ADVANTAGES OF THE INVENTION

Accordingly, several objects and advantages of the present invention are to provide convenient, effective not complex and not expensive apparatus generating light illuminated line.

It is another object of the invention to provide the light propagation precisely under the assigned angle.

It is still another object of the invention to increase the convenience to operate the light line-illuminating apparatus.

It is further object of the invention to reduce the operational time of the construction workers during propagation of the light lines on the reference surface.

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which.

SUMMARY OF THE INVENTION

Most known construction, mechanical and/or electrical alignment devices are cumbersome, some of them are not as useful as they could be, for instance, the use of the chalk lining devices is sometimes undesirable and/or inapplicable for the finished, interior areas.

Thus, there is a great need in the art for the improved not complex and not expensive apparatus generating light illuminated line, providing a precise angles of the light line relatively to the horizontal (ground level) and/or vertical axes on the reference surface (e.g. construction wall, etc.).

An improved apparatus generating light illuminated line provides a possibility to produce and propagate the light line along the reference surface.

An improved apparatus generating light illuminated line includes a circular scale means comprising two projections, each of which includes an aperture intended for an appropriate fixing means. Each fixing means comprises a handle rigidly connected to a pin and a back-moving spiral spring located in a spring opening of the appropriate projection. Also, the improved apparatus generating light illuminated line includes a pivotable light line generating portion hingedly coupled with the circular scale means.

DESCRIPTION OF THE PREFERRED EMBODIMENTS

Herein the description of an improved apparatus generating a light illuminated line will be done in statics (as if the components of the improved device are suspended in the space) with description of their relative connections to each other. The description of the functional operations of an the improved apparatus generating a light illuminated line will be done hereinafter.

Figure 1:
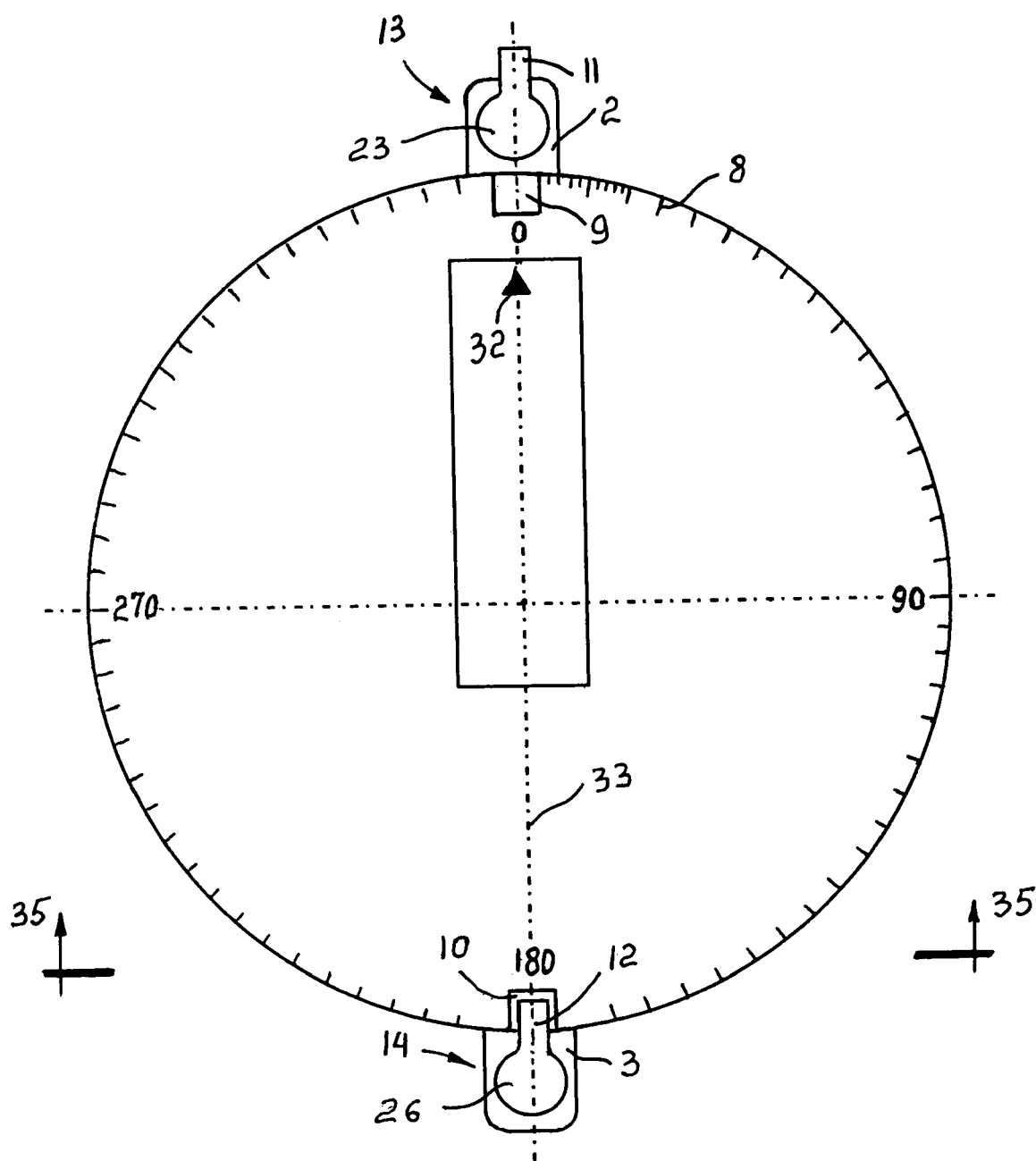
FIG. 1 is a simplified top view of the improved apparatus generating light illuminated line.

An improved apparatus generating a light illuminated line, referring to FIG. 1, includes a circular scale means 1 comprising a first projection 2 and a second projection 3. The first projection 2 includes a first aperture 4 and a first spring opening 6. The second projection 3 includes a second aperture 5 and a second spring opening 7. The circular scale means 1 also includes a degree scale 8, a scale opening 15 intended for the first inserting portion 16 of the hinging means 17, a first nozzle opening 9 intended for the first nozzle 11 of the first fixing means 13, a second nozzle opening 10 intended for the second nozzle 12 of the second fixing means 14. The hinging means 17 also comprises a cylindrical portion 18 and the second inserting portion 19. The hinging means 17 can be presented by any suitable hinging means based on any known hinging principles instead of the hinging means described herein.

Also, the improved apparatus generating a light illuminated line includes a pivotable light line generating portion 20 comprising a light line generating means opening 21 intended for the second inserting portion 19, and a laser diode (not shown), an optical system (not shown), a power supply (not shown) and an electrical switch (not shown). For instance, the power supply, providing the electrical power source, can be presented by any kind of battery(ies) reasonably suitable for such portable apparatus. The laser diode can be presented by any reasonable manufactured or special designed laser diodes. The optic system may be presented by any reasonable prism(s), lens(es) transmitting the generated by laser diode light preferably in an asymmetrical planar beam. The first fixing means 13 includes a first pin 22 rigidly connected to the first pin handle 23, and the first back-moving spiral spring 24 installed into the first spring opening 6. The second fixing means 14 includes a second pin 25 rigidly connected to the second pin handle 26, and the second back-moving spiral spring 27 installed into the second spring opening 7. Each of the first 13 and second 14 fixing means can include the stopper, e.g. such as the first 36 and second 37 fixing washers, preventing the pulling of the pin out of the aperture, as it is shown in FIG. 2.

Figure 2:
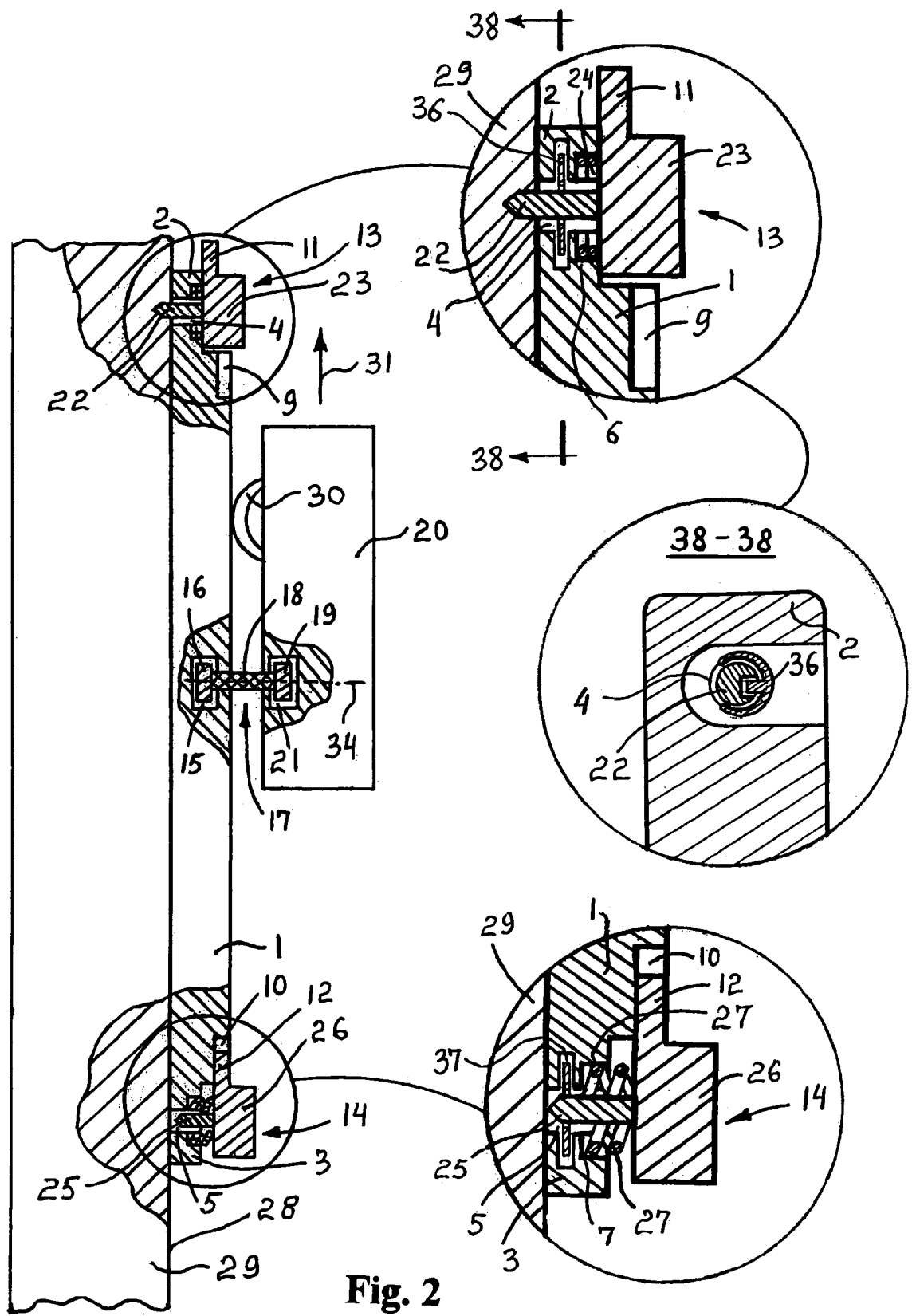
FIG. 2 is a simplified side view of the improved apparatus installed on the wall.

In FIG. 2, the firs fixing means 13 is shown in the pressed-down position when the apparatus is attached to the front (reference surface 28) of the wall 29, and, the second fixing means 14 is just for example shown in its position-up (the second pin 25 of the second fixing means 14 is not in contact with the wall 29). The pins 22 and 25 of the fixing means 13 and 14 respectively in the not operating position (the apparatus is not attached to the wall 28) are kept in the upper position in order to "hide" the sharp pins 22 and 25 inside the aperture 4 and 5 respectively thereby providing safety of an operator (e.g. construction worker, etc.). The nozzles 11 and 12 in the upper position are located into first 9 and second 10 nozzle openings respectively and sprang by the first back-moving spring 24 and second back-moving spring 27 respectively. The pivotable light line generating portion 20 can include the bow spring 30, which provides the none-rigid fixation of the pivotable light line generating portion 20 at its desired degree position on the circular scale means 1 during the use of the propagated (e.g. on the wall 29) light from the portion 20 in the selected light direction 31. Any other kinds of the pivotable light line generating portion 20 fixation at desired (selected) degree angle can be used, for instance, by the sprang ball (not shown), the blade spring (not shown), the configured plane spring (not shown), etc. The circular scale means 1 can comprise the appropriate dips, depressions, recesses, etc (all not shown) on the scale means 1 face surface in order to provide tighter fixation of the pivotable light line generating means 20 position on the scale means 1. The light line generating means 20 is pivotable around axis 34.

In the initial stage, both fixing means 13 and 14 are in the upper position (not shown, in FIGS. 1, 2 the second fixing means 14 is shown in the upper position) and the nozzles 11 and 12 are located into their appropriate nozzle openings 9 and 10, providing safety (preventing the sharp pins 22, 26 accidental extension and operator's (user's) injury). For installation on the wall 29, the first nozzle 11 of the first fixing means 13 is released from the first nozzle opening 9 and rotated in any desirable direction until position providing unobstructed movement of the first pin 22. After that, the apparatus is by the first pin 22 of the first fixing means 13 slightly (not rigidly) attached to the wall 29, thereby providing free hanging of the apparatus on the first pin 22. The pivotable light line generating portion 20 can be located in the 0° position, as it is shown in FIG. 1 (in FIG. 1, the pivotable light line generating portion 20 is conditionally shown in the position of 0° according to the appropriation of the degree mark 31 on the pivotable light line generating portion 20 and "0°" on the scale means 1), or preferably should be located in the position of 180°. In such position, considering apparatus symmetricalness relatively the device axis 33 and considering the gravity effect, the apparatus is perfectly vertically located relatively to the ground level (the apparatus is hanged on the first pin 22 and the axis 33 is perpendicular to the ground level). In this hanged condition, the user makes final fixation of the apparatus to the wall 29 by pushing the first 23 and second 26 pin handles in the direction to the wall 29, thereby deeper penetrating the first pin 22 and second pin 25 respectively of the first 13 and second 14 fixing means. After that, any desirable angle of the illuminated line can be provided by the pivotable light line generating portion 20 rotation around the axis 34 (see also FIG. 2).

Figure 3:
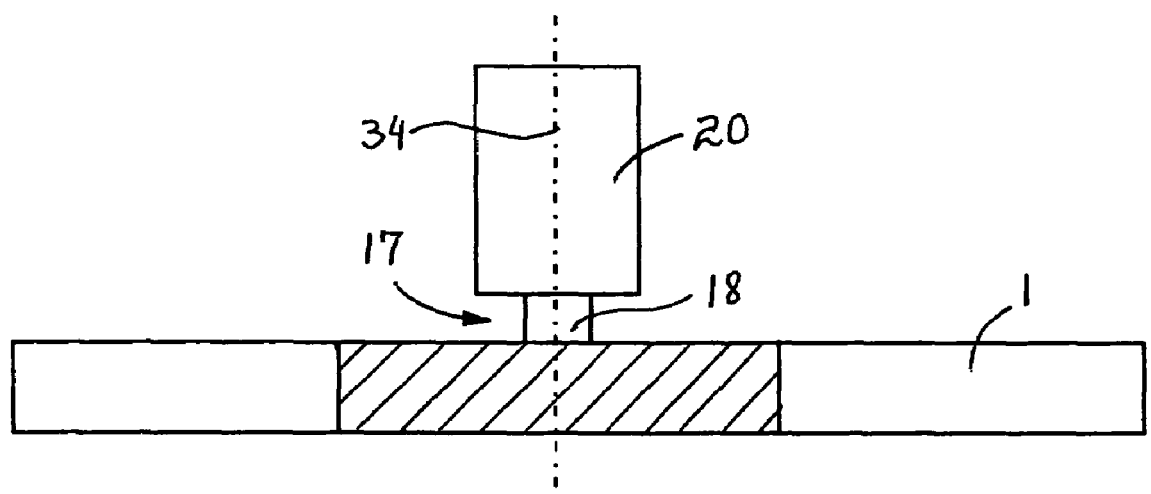
FIG. 3 is a simplified bottom cross-sectional view 35—35 of the improved apparatus generating light illuminated line.

In FIG. 3, the pivotable light line generating means 20 is conditionally shown of the rectangular form, but the pivotable light line generating means 20 can be of any reasonable or esthetical or ergonomical geometrical form, shape and configuration. All components and means of this invention are not limited by the given description, and can be of any reasonable not hazardous for human health material, e.g. such as plastic (e.g. acrylic resin, polyvinyl chloride or polyamide polymer, which can be formed into the desired shape, etc.), or metal, etc, and of any geometrical configuration considering provision of any additional handles, holders, etc., and any colors, forms, shapes, etc. The fixing of the lower portion of the apparatus (as well as the fixing of the upper portion of apparatus) to the reference surface 28 of the wall 29 can be provided, for example, by the double side adhesive tape (not shown), "Velcro" lock also known as a hook and loop fastener or a hook and loop tape (not shown), etc. or by any other suitable ways instead of the use of the second pin 25 (as well as the first pin 22). For instance, the magnetic principles and fixing means can be used for attaching the apparatus to the metallic reference surface, pipes, etc. The degree scale may be of any kind (in FIG. 1 it is shown a conditional/conventional/scale) Considering that the light is a plane, those skilled in art will recognize that the improved apparatus provides the projection of the plane light line over and beyond the obstructions, allowing an operator (user) to align several objects without having to move the apparatus. The principles of the light emission provided by the pivotable light line generating portion 20 in this invention are not limited by the given description, and for example the laser diodes based on the vertical-cavity surface-emitting principles (VCSEL) are equally applicable to this invention.

Such laser diode has an essentially symmetrical light-output, or, for instance, the edge-emitting laser diode having an astigmatic light-output can be used too, etc.

Thus, an improved apparatus generating light illuminated line provides convenient, effective, non-expensive, and compact device for use in the construction, interior-exterior design, etc. applications, providing possibility to illuminate a light line on the reference surface under any desirable angle without moving the apparatus.

CONCLUSION, RAMIFICATION AND SCOPE

Accordingly the reader will see that, according to the invention, I have provided the improved apparatus generating light illuminated line. The improved apparatus generating light illuminated line has various possibilities, considering activities and applications of the devices producing line on the reference surfaces.

While the above description contains many specificities, these should be not construed as limitations on the scope of the invention, but as exemplification of the presently-preferred embodiments thereof. Many other ramifications are possible within the teaching to the invention. For example, the improved apparatus generating light illuminated line can effectively work on the not absolutely flat surface, for instance, such as on the shingle roof, etc.

Thus, the scope of the invention should be determined by the appended claims and their legal equivalents, and not by examples given.

THE DRAWING REFERENCE NUMERALS

1.—a circular scale means;
2.—a first projection;
3.—a second projection;
4.—a first aperture;
5.—a second aperture;
6.—a first spring opening;
7.—a second spring opening;
8.—a degree scale;
9.—a first nozzle opening;
10.—a second nozzle opening;
11.—a first nozzle;
12.—a second nozzle;
13.—a first fixing means;
14.—a second fixing means;
15.—a scale opening;
16.—a first inserting portion;
17.—a hinging means;
18.—a cylindrical portion;
19.—a second inserting portion;
20.—a pivotable light line generating portion;
21.—a light line generating portion opening;
22.—a first pin;
23.—a first pin handle;
24.—a first back-moving spiral spring;
25.—a second pin;
26.—a second pin handle;
27.—a second back-moving spiral spring;
28.—a reference surface;
29.—a wall;
30.—a bow-spring;
31.—a light direction;
32.—a degree mark;
33.—a device axis;
34.—an axis of rotation;
35—25 is a cross-sectional view;
36—a first fixing washer;
37—a second fixing washer;
38—38 is a cross-sectional view

What is claimed is:

1. An improved apparatus generating light illuminated line comprising a circular scale means including
   a 360° degree scale located on a face side in a rim area of said circular scale means;
   a first projection extended from said circular scale means at 0° degree area of said degree scale;
   a first aperture located in said first projection;
   a first spring opening located in said first projection;
   a first nozzle opening located in said face side of said circular scale means at said 0° degree area of said degree scale;
   a second projection extended from said circular scale means at 180° degree area of said degree scale;
   a second aperture located in said second projection;
   a second spring opening located in said second projection;
   a second nozzle opening located in said face side of said circular scale means at said 180° degree area of said degree scale;
   a scale opening located at a center of said circular scale means,
a hinging means including
   a cylindrical portion one side of which is coupled with a first inserting portion, and wherein said first inserting portion is installed in said scale opening;
   a second inserting portion coupled with the another side of said cylindrical portion;
a power supply providing the electrical power source for a light line generating portion including a laser diode generating a light directed to an optical system providing a light line along a plane of said circular scale means and wherein said light line generating portion comprises a light line generating portion opening intended for installation of said second inserting portion of said hinging means;
a first fixing means including
   a first handle comprising a first nozzle;
   a first pin by the one end rigidly connected to said first handle of said first fixing means, and by another end is coupled by a first fixing washer with said first projection of said circular scale means, and wherein said first pin has an outer diameter smaller than the diameter of said first aperture to provide an unobstructedly passage of said first pin through said first aperture;
   a first back-moving spiral spring placed in said first spring opening;
a second fixing means including
   a second handle comprising a second nozzle;
   a second pin by the first end rigidly connected to said second handle of said second fixing means, and by the second end is coupled by a second fixing washer with said second projection of said circular scale means, and wherein said second pin has an outer diameter smaller than the diameter of said second aperture to provide an unobstructedly passage of said second pin through said second aperture;
   a second back-moving spiral spring placed in said second spring opening.

2. The apparatus of claim 1, wherein said first fixing means and said second fixing means further are appropriately presented by a first portion of a double side adhesive tape and a second portion of said double side adhesive tape attached to a reference surface of a wall appropriately across said first projection and said second projection, or by a first hook and loop fastener and a second hook and loop fastener appropriately located in the area of said first and said second projections and wherein a first loop portion of said first hook and loop fastener and a second loop portion of said second hook and loop fastener are attached to said reference surface of said wall appropriately across said first projection and said second projection and a first hook portion of said first hook and loop fastener and a second hook portion of said second hook and loop fastener are appropriately attached to said first projection and said second projection, or by a first magnetic portion attached to said first projection and a second magnetic portion attached to said second projection.

3. The apparatus of claim 2, wherein further is said first hook portion of said first hook and loop fastener and said second hook portion of said second hook and loop fastener are attached to said reference surface of said wall appropriately across said first projection and said second projection and said first loop portion of said first hook and loop fastener and said second loop portion of said second hook and loop fastener are appropriately attached to said first projection and said second projection.

* * * * *